Figure 1:
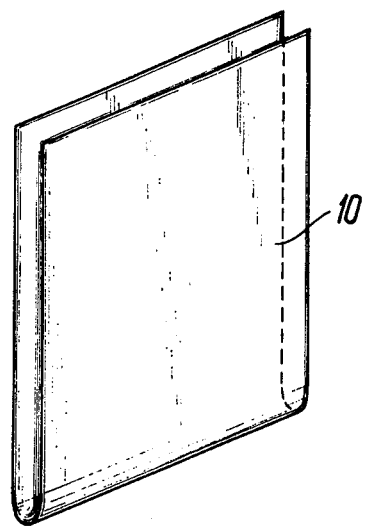

United States Patent [19]

Jentsch

[11] 4,041,851
[45] Aug. 16, 1977

[54] METHOD FOR MAKING PLASTIC BAGS

[76] Inventor: Hans G. Jentsch, Daimler Strasse 4, 43 Essen, Germany

[21] Appl. No.: 361,665

[22] Filed: May 18, 1973

Related U.S. Application Data

[62] Division of Ser. No. 151,320, June 9, 1971, abandoned.

[30] Foreign Application Priority Data

| June 11, 1970 | Germany | 2028693 |
| Mar. 30, 1971 | Germany | 2115350 |
| Apr. 1, 1971 | Germany | 7112470 |

[51] Int. Cl.² .............................................. B31B 31/60
[52] U.S. Cl. ............................... 93/35 SB; 93/DIG. 1
[58] Field of Search ............ 93/35 SB, 35 R, DIG. 1, 93/33 H, 8 VB, 18, 26, 31, 36 DA

[56] References Cited

U.S. PATENT DOCUMENTS

| 3,006,257 | 10/1961 | Orsini | 93/35 R |
| 3,334,553 | 8/1967 | Hewitt et al. | 93/35 R |
| 3,380,646 | 4/1968 | Doyen et al. | 93/35 R X |
| 3,412,918 | 11/1968 | Sherman | 229/66 X |
| 3,431,829 | 3/1969 | Goodwin | 93/8 V B X |
| 3,654,841 | 4/1972 | Davis, Jr. | 93/33 H |

Primary Examiner—James F. Coan
Attorney, Agent, or Firm—Allison C. Collard

[57] ABSTRACT

The invention provides a novel method of making a plastics bag and a novel plastics bag, the method comprising folding a sheet of plastics material to form a U-shaped blank, welding the longitudinal edges of the blank, and providing either two or four weld seams at the base of the bag to provide a bottom wall defined at least in part by said seams, said seams serving to give the bag stability whereby it may be stood on said bottom wall. The top of the bag may be closed in various ways, for example by straight or inclined weld seams and a funnel like pouring spout may be provided if desired.

10 Claims, 13 Drawing Figures

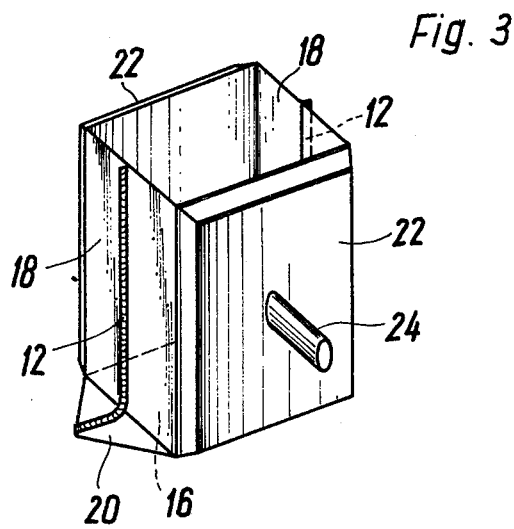
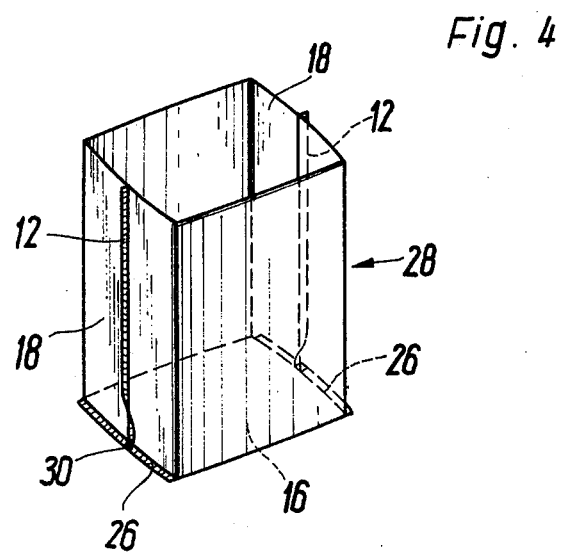

METHOD FOR MAKING PLASTIC BAGS

This is a divisional application of application Ser. No. 151,320 filed on June 9, 1971, and now abandoned.

The invention relates to a method for the production of a plastics bag for packaging purposes and to plastics bags produced by said method.

The prior art discloses bags, produced from a tubular blank which is closed at the top and bottom by straight welding seams. Such bags, which may for example be used for packaging milk, i.e., they cannot be placed in an upright position safely or at all because they do not have a flat bottom wall and must therefore be stored either horizontally, or otherwise upright in a separate container. When such a bag has been opened for the removal of milk, for example by cutting off one corner, the use of a container is essential in order to retain the bag upright and prevent the contents from spilling.

The prior art also discloses plastics bags which are provided with a base, the base being formed in a manner similar to that adopted for the basis of known carrier bags, namely by providing a tubular blank, folding together the bottom portions thereof, positioning the portions superjacently, and joining such superjacent portions. However, this does not produce a perfectly smooth bag bottom surface so that such plastics bags are not satisfactory as regards stability. Moreover, a sealing tight closure of the bottom surface is difficult to achieve with the last mentioned method, and for this reason the more reliably sealed but less stable bags first mentioned above are preferred for containing liquids.

It is an object of the invention to disclose a method for the production of a stable plastics bag, where such method can be performed in simple manner, the plastics bag produced thereby being stable and sealing tight, and permitting hygienic packaging of the material which is subject to the risk of germ infection.

According to the invention, the problem is solved in that a substantially rectangular integral length comprised by a layer or film of plastics material is folded together, the folded film blank then being welded along two superjacently disposed edges, and at least two further welding seams being applied in the zone of the bottom surface of the bag, said seams at least partially defining a bottom wall of the bag.

If a bag according to the invention is intended to receive substantial quantities of material, for example quantities of between 200 and 10,000 cubic centimeters, the film blank may be folded once onto itself to provide two blank sections, the two blank sections being disposed flat and superjacently, whereafter the superjacent portions of each longitudinal edge of the blank are welded together, thus producing a bag the bottom edge of which is closed in seamless manner and the top of which is open, the bag thereafter being gripped by its flat opposite sides which sides are then drawn apart so that two further side walls and a bottom wall of the bag are formed, two flaps thus being produced which extend outwardly of the bag, each flap having one wall thereof extending from the bottom wall of the bag and another wall thereof extending from one of said two further side walls, the walls of each flap being welded together at a position remote from the free ends of each flap, the flap parts beyond the welding seam then preferably being cut off.

A bag produced in the above manner has a smooth bottom wall reinforced on two side edges thereof by means of two outwardly extending welding seams, the said bottom wall and seams providing the bag with stability when stood on said bottom wall.

The surfaces which abut on one another at each weld are surfaces on the same side of the original blank which both aids the production of sterile packages in cases where the material to be packed is liable to be infected by germs, and also permits the use of a laminated blank in which only one lamination and component which will be disposed inwardly of the bag is weldable.

The stability and appearance of the filled bag, in a further and advantageous embodiment of the invention, is improved if the longitudinal edges are so welded that the welds converge slightly in the direction towards the top open bag end so that the bag tapers upwardly.

If a plastics bag is required for containing a smaller quantity of material, for example a quantity of between 15 and 500 cubic centimeters, it is possible for the welding seams which at least partially define the bottom wall of the bag to be produced first. Thus, a blank may be folded into W shape, for example by first forming it into U shape and then forming a tuck in the bottom portion thereof, the bottom creases resulting from the W shaped bottom fold being welded to form welding seams which will define in part a bottom wall of the bag, the longitudinal edges of the blank, that is the sides of the bag then being welded.

To obtain a simple closing of the bag after it has been filled, the open top end of the bag may be closed by the plastics layers at the upper end of the bag being pressed upon each other so that either their sections disposed between the welded longitudinal edges or two halves of the sections disposed between the welded longitudinal edges are positioned flat and superjacently, whereafter a horizontally extending welding seam is provided across the top of the bag. It is also possible for a bag according to the invention to be closed in such a manner as to provide a pouring spout adjacent a top corner thereof, and such pouring spout may be closed at the top by a weld seam. Alternatively, the upper end of the bag could be sealed by being provided with a top wall similar to the bottom wall.

If the bag is to be used to contain material which must be excluded as far as possible from contact with air even after the bag is opened, it is advisable to use a straight weld seam at the top of the bag or alternatively a weld seam which rises at a slight angle towards the top of the bag. Such weld seam extends from one longitudinal edge towards the second longitudinal edge, and terminates just short of said second longitudinal edge, a second weld seam being provided and extending from the termination of the first weld seam substantially perpendicularly thereto and in a direction parallel to the second longitudinal edge to define a self closing spout obtained by plastics film layers which are in flat superjacent disposition. The resultant open end of the self closing pouring spout is closed for transportation and for the filled bag by a welding edge which can be cut off.

In order to prevent the weld seams from coming apart, it is advantageous if each seam is made in such a manner that the outer surfaces of the welded layers are fused to each other along the edge of each weld.

A stable plastics bag for containing material and according to the invention may comprise a bag having a bottom wall and four side walls, the bag comprising a plastics sheet extending seamlessly from the top of a first side wall of the bag over a substantially rectangular bottom wall to the top of an opposite and second side wall, the bag being welded on each of the third and fourth side walls by means of first and second weld seams extending centrally on respective third and fourth walls from top to bottom thereof, third and fourth weld seams being provided connecting said third and fourth walls to the bottom wall, such third and fourth seams being connected to respective ones of said first and second seams and extending at right angles thereto, and extending for the length of the third and fourth walls.

Alternatively, a stable plastics bag for containing material according to the invention may be, when collapsed, of generally W-shape in cross section, the two creases formed at the base of the W being welded to form welder seams which will at least partially define a bottom surface of the bag when the bag is in use, the two longitudinal edges of the collapsed bag also being formed with weld seams.

Because the surfaces which are welded to one another during the welding operations are all provided on the same side of the original blank forming the bag, laminated foil may be used which can be welded on one side only. The laminated foil part which faces outwardly in the finished package may then be selected without reference to its weldability, but merely with respect to having an attractive external appearance and/or a desired stiffness.

To facilitate the opening of a plastics bag according to the invention, a wedge shaped blanked out portion may be provided in the upper edge of a top weld seam of the bag, the blanked out portion terminating just short of the seam.

Figure 5:
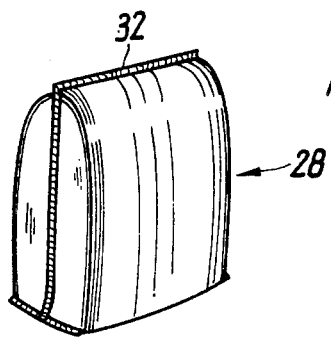
Figure 6:
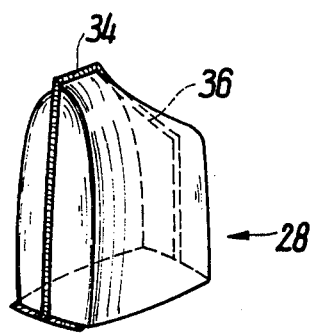
Figure 7:
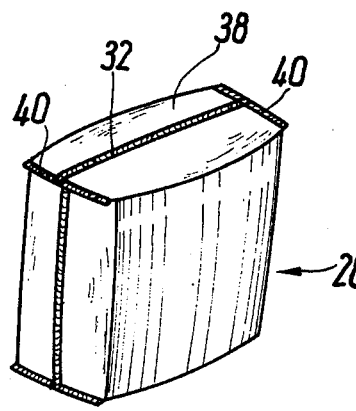
Figure 8:
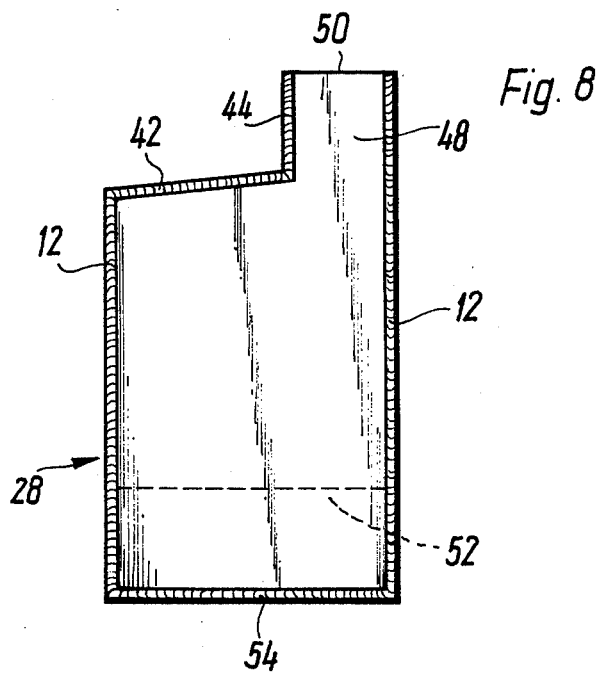
Figure 13:
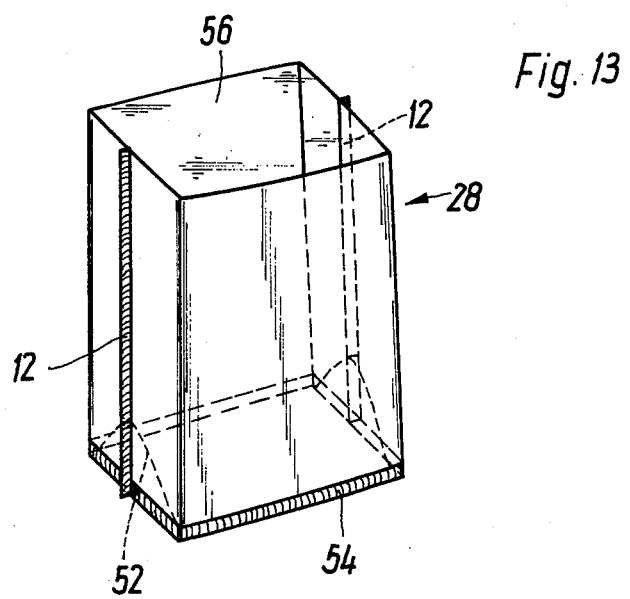
Figure 9:
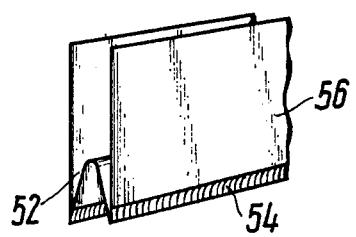
Figure 10:
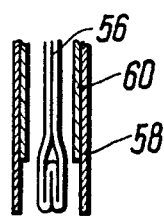
Figure 11:
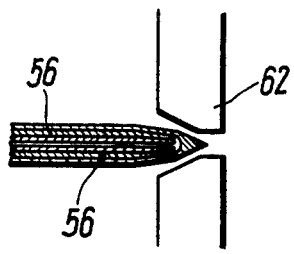
Figure 12:
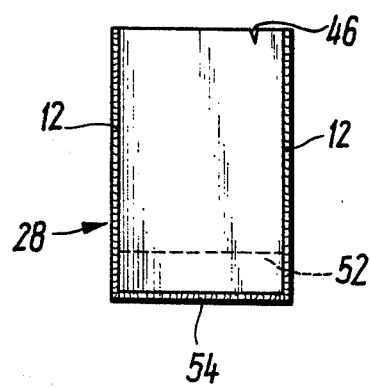

Several embodiments of the invention will now be described by way of example and with reference to the accompanying drawings in which:

FIGS. 1 to 4 show consecutive stages in the production of a plastics bag according to a first embodiment of the invention, FIG. 5 shows a plastics bag according to the invention after the bag has been filled with material and closed by a horizontal weld seam, FIG. 6 shows a plastics bag according to the invention closed by two weld seams in such a manner as to provide a pouring spout, FIG. 7 shows a plastics bag according to the invention closed in such a manner as to provide a horizontal top wall, FIG. 8 shows a further embodiment of plastics bag according to the invention provided with a self-closing spout, the bag being shown in a folded state, FIG. 9 is a view illustrating a step in the production of the bag illustrated in FIG. 8, FIG. 10 is a partial end view of the plastics bag shown in FIG. 9, and showing a further stage in the production of the bag, FIG. 11 is a partial sectional view of the plastics bag of FIG. 8 as seen from the top, the view showing welding jaws for welding the longitudinal seams, FIG. 12 is a view of a plastics bag according to the invention and corresponding to FIG. 8, but without a self-closing pouring spout, being provided instead with a tear-open notch and shown in a folded state, and FIG. 13 is a perspective view of the plastics bag shown in FIG. 12 in an unfolded state and with the top not closed.

To explain the method according to the invention, different stages in the production of one embodiment of a plastics bag according to the invention are illustrated in FIGS. 1 to 4.

The first stage in the production of a bag according to the invention is shown in FIG. 1. This bag may be produced from an oblong blank comprised of a sheet or film of plastics material which is folded double about its transverse center line. The blank may be drawn off from a film web of suitable width coiled into a reel, and may be cut off from the film web in suitable manner either before or after folding has been performed.

Figure 2:
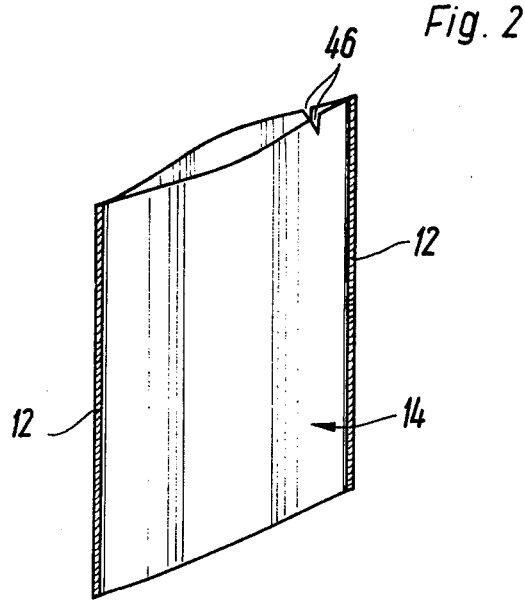

After folding of the blank, each longitudinal edge of the blank is in two halves which join at the fold line, and in the next step in the production of the bag the two halves of each longitudinal edge of the film 10 are joined to each other by means of welding seams 12 so as to produce a non stable plastics bag 14 illustrated in FIG. 2. The opposite side walls of this bag are then gripped in suitable manner and drawn apart so as to form a horizontal bottom wall 16 and two further side walls 18 extending perpendicularly to and having the same width as said bottom wall 16. Under these conditions, the welding seam 12 will extend centrally of the walls 18 and two flaps 20 are formed, one of the flaps being visible in FIG. 3. Each flap has an upper wall extending from a side wall 18 and a lower wall extending from the bottom wall 16. In FIG. 3, the second flap 20 is obscured by one of the two suction platens 22 which are used to grip the bag and pull it apart in the desired manner. The suction platens 22 are both hollow plate members, connected to a source of negative pressure through connecting ducts 24. The suction platen surfaces which act on the plastics bag 14 are provided with a plurality of small apertures so that the suction platens, applied to the bag 14 and biased with negative pressure are able to reliably retain the bag faces and to permit tensioning of the bag into the shape shown in FIG. 3.

It will be evident that the dimensions of the suction platens 22 must be selected in accordance with the size of the blank 10 and the desired width of the bottom wall 16 and of the side wall 18. Accordingly, the width of each suction platen 22 must be so dimensioned that, assuming central application onto the flat bag 14, it is narrower than the associated flat bag side whereby bag sections project from both sides of the platen, the width of each projecting bag section being equal to half the width of each side wall 18 which will be formed. To ensure that the bottom wall 16 is also provided with the correct width, it is necessary for the lower edge of each suction platen to be spaced by a suitable distance from the lower bag edge, which distance is equal to half the width of the bottom wall 16 and of the side walls 18. The amount of overlap of the bag relative to the platens when they are first applied is therefore the same on each side and at the bottom.

After tensioning of the plastics bag 14, the two walls of each flap 20 are pressed together and the walls are joined to each other by means of a weld seam 26 (FIG. 4) extending in a horizontal direction at 90° to the weld seam 12. The portions of each flap which extend outwardly beyond the weld seams 26 are cut off, the seams 26 then defining in part the bottom wall 16 of the bag. Production of the plastics bag 28 in accordance with the invention and illustrated in FIG. 4 is then completed. With the bag in this form, it may be filled with material and may subsequently be closed at its upper edge. FIG. 4 shows that the welding seams 12 and 26 extend outwardly of the bag and that they are connected together at a position 30. The bag 28 has a smooth bottom wall 16 and is therefore stable. The stability is enhanced by the projecting weld seams 26 which are stiffer than the remainder of the bag material. A slightly converging configuration of the longitudinal weld seams 12 in the direction of the open end of the bag also increases stability. It will be evident that the above method is also suitable for use with a laminated film blank in which only that film part need be weldable which is disposed on the interior in the finished bag because, in contrast with prior art bags having a bottom, the faces which abut one another at each weld are always provided by one side face of the original blank forming the bag. This means that plastics bags, sealed to paper or aluminium foil can also be provided without difficulty, and also sterile packaging of material subject to the risk of germ infection is facilitated. The filled plastics bag 28 is closed after the bag has been filled with material. FIGS. 5 to 7 shows three possible methods of closing the bag, although it will be appreciated that the bag could be closed in any other desired known manner.

In FIG. 5 the bag is closed by a simple horizontally extending cross-weld seam 32, while in FIG. 6 it is closed by a short horizontal weld seam 34 and a second weld seam 36 disposed at an angle so that a pouring spout is produced when the short upper horizontal weld seam 34 is cut off. Referring now to the closure illustrated in FIG. 7, the top of the bag is provided with a top wall similar to the bottom wall 16. Thus, welding seams 40 are provided which correspond to the welding seams 26, the bag also being closed by a welding seam 32 which extends centrally over the top. The manner in which the top closure above described is formed is similar to the manner in which the bottom closure is formed, the side walls of the bag being pulled apart at the upper portion of the bag after the top horizontal seam has been made.

FIGS. 8 and 9 show a further embodiment of the bag according to the invention, the bag being shown in a folded state and provided on the top with a self-sealing pouring spout 50. The self sealing pouring spout 50 is formed by extensions 48 of the superjacently disposed halves of the blank. The pouring spout 50 is defined by a longitudinal weld seam 12 and by a short and substantially vertically extending welding seam 44 disposed at a distance from the longitudinal welding seam 12 and merging at its lower end into a welding seam 42 which closes the remaining zone of the bag at its top edge and extends horizontally or preferably at a slight downward angle. The two extensions 48 bear firmly upon each other so that they are retained together by their natural stress or adhesion forces. For transportation purposes, it is also possible for the self sealing pouring spout to be closed by an upper edge which is adapted for cutting off or tearing off. To empty the bag contents slight pressure is applied to the lower part of the bag so that the adhesion forces in the extensions 48 are overcome to enable the contents of the bag to be discharged. Light stroking over the extensions 48 recloses the closure.

FIG. 9 shows a step in the manufacture of the bag of FIG. 8, a blank 56 comprised of a plastics film or sheet, originally folded in U-shape being then formed with a tuck 52 at the base of the U so that the cross section of the blank has the shape of a W. The lower creases of the W are welded at 54 in order to form weld seams which will define in part a bottom wall of the finished bag as may be seen in FIG. 13. The longitudinal bag edges are welded during the next production step which is shown diagrammatically in FIG. 10. Since a four-layer laminate is produced in the bottom zone and a two-layer laminate in the remaining zone, the welding jaws 58 are operated at different temperatures in different regions thereof. Also, facings 60 are provided on the upper parts of said welding jaws 58 to compensate for the different thicknesses of the bag in the upper and lower regions thereof. In order to prevent delamination of the longitudinal welding seam of the bag as well as of the bottom welding seam 26 in the embodiment illustrated in FIG. 4, it is advisable to weld the seams by means of welding jaws 62 which are tapered slightly as shown diagrammatically in FIG. 11. By this welding operation the outer surfaces of the plastics bag are welded together so that the said bag is completely sealed relative to the exterior.

The top edge of the bag shown in FIGS. 2 and 12 are provided with a wedge-shaped blank portion 46 disposed at a slight distance from one of the longitudinal seams, the said blanked portion being only slightly shorter than the width of a welding seam placed over it. The blanked portion facilitates tearing open of the closed bag. It is of course also possible for the blanked portion to be formed in the completed closure welding seam after the bag has been closed (it will be understood that an unfilled bag can be more readily handled than a filled bag).

FIG. 13 shows the last described embodiment of the stable plastics bag in the unfolded state. It can be seen that the bottom welding seams 54 surround the entire bottom wall and thus ensures the stability of the bag. The flaps 20 (FIG. 3), which are cut off after welding of the seam 26 in the embodiment illustrated in FIG. 4, are inwardly folded in this embodiment owing to the W shaped folding of the bag during the production thereof. The part shown in broken lines at 52 in the drawings and corresponding to the flap 20 need therefore not to be welded and cut off in this embodiment. The bag shown in FIG. 13 may be sealed in any suitable manner as shown above.

I claim:

1. A method of making a plastics container having a bottom wall in a W-shaped configuration from a single sheet or film of plastics material, comprising the steps of:
    a. folding a laminated sheet or film blank having at least one layer of weldable plastics material upon itself to provide two superjacently disposed blank sections in a U-shaped configuration;
    b. forming a tuck at the base of said U-shaped portion to impart a W-shaped configuration thereto to enable formation of said bottom wall;
    c. welding the bottom creases resulting from said W-shaped folding to form weld seams defining in part said bottom;
    d. forming longitudinal weld seams of said blank sections by applying first welding jaws at both exterior sides of the superjacent portions along each longitudinal seam, leaving a sealable opening formed by the upper edges of said container blank sections; and after cutting
    e. overwelding the longitudinal weld seams at the outer edges thereof by applying further welding jaws at both exterior sides of said weld seams so that the layers of weldable plastics material are melted together thereby completely sealing the container relative to the exterior.

2. The method as in claim 1 wherein said first and second welding steps occur at different temperatures, and further comprising the step of adjusting the welding pressure to correspond to the different thickness at the longitudinal edges and the pair of bottom folds of the W-shaped bottom.

3. The method as claimed in claim 1 further comprising the steps of cutting a wedge-shaped tear-open notch downwardly into the upper portion of the upper edge of each open blank section in the same position, and less than the width thereof, to facilitate tearing open the closed container when said upper edges are substantially welded by a closing seam.

4. A method according to claim 1, wherein the welding temperature applied by said first welding jaws to weld each longitudinal edge in the region of the container having a double thickness of plastics sheet laminated film is different from the welding temperature applied by said welding jaws in the region of the container having a quadruple thickness of plastics sheet laminated film caused by said W-shaped configuration, and wherein means used to applying welding pressure to the longitudinal edges of the container are arranged to compensate for the difference in thickness between the region of the container having a double thickness of plastics sheet laminated film and the region having a quadruple thickness.

5. The method of claim 4 further comprising the steps of forming a self-sealing pouring spout formed by extensions of said superjacently disposed sections of the blank at the top end of the container, thereafter welding a seam running substantially parallel to the longitudinal end portions of the two blank sections, said seam being disposed towards the vertical center line of the container, and welding a further seam at a slight downward angle from the lower end of the former seam to one of the longitudinal welding seams defining one of the vertical edges of the container leaving an opening in the spout allowing the spout sides to close by adhesion.

6. A method of making a plastics container having a bottom wall upon which the container may be stood in an upright position, comprising the steps of:
   a. providing a blank in the form of a rectangular sheet of laminated film having at least one surface layer of weldable material;
   b. folding said blank upon itself to provide two blank sections, the sections being at least partially disposed superjacently, at least portions of the longitudinal edges of the blank sections being superjacent;
   c. welding together the superjacent portions of each longitudinal edge of the blank;
   d. applying two further welds or weld seams in the zone of the bottom surface of the container, said further welds or weld seams at least partially defining the bottom wall of the container; and
   e. overwelding at least some of the weld seams at the outer edges thereof so that the layers of weldable plastics material are melted together which completely seals the container relative to the exterior.

7. A method according to claim 6, wherein the blank is folded so as to be of W-shape in section, the blank thus having two lower folds, said lower folds being welded to provide welds which will define in part the bottom wall of the container when made, each longitudinal edge of the blank being then welded.

8. A method according to claim 6 wherein the superjacent portions of each longitudinal edge are welded together in such manner that the welds converge upwardly of the container.

9. A method according to claim 6 wherein an upper sealing welding seam is formed, said seam being provided with a wedge shaped blanked out portion at a distance spaced from the welded superjacent portions, said blanked out portion being only slightly shorter than the widths of said sealing welding seam.

10. A method of making a plastics bag having a bottom wall upon which the bag may be stood in an upright position, comprising the steps of:
   a. providing a blank in the form of a rectangular sheet of laminated film having at least one surface of weldable plastics material;
   b. folding said blank once upon itself to provide two blank sections, the sections being disposed superjacently;
   c. welding together the superjacent portions of each longitudinal edge of the blank to form longitudinal weld seams thus producing a bag having two side walls, a bottom edge which is closed seamlessly and a top which is open;
   d. gripping the bag by each of said side walls and drawing the side walls apart to form two further side walls and a bottom wall, two double walled flaps thus being formed which extend outwardly of the bag, each flap having one wall thereof extending from one of said two further side walls and another wall extending from said bottom wall;
   e. welding together the said walls of each flap to form a weld seam at a position spaced from the free end of each flap and adjacent the bottom wall, and cutting off the portion of each flap disposed beyond the weld seam; and
   f. rewelding at least some of the weld seams at the outer edges thereof so that the layers of weldable plastics material are melted together which completely seals the container relative to the exterior.

* * * * *